UNITED STATES PATENT OFFICE.

PATRICK J. CANNON, WILLIAM H. YOUNG, AND CLINTON BATEHOLTS, OF SCHENECTADY, NEW YORK, ASSIGNORS TO GENERAL ELECTRIC COMPANY, A CORPORATION OF NEW YORK.

INSULATING COMPOUND.

No. 910,989.     Specification of Letters Patent.     Patented Jan. 26, 1909.

Application filed December 26, 1903. Serial No. 186,751.

*To all whom it may concern:*

Be it known that we, PATRICK J. CANNON, WILLIAM H. YOUNG, and CLINTON BATEHOLTS, citizens of the United States, residing at Schenectady, county of Schenectady, State of New York, have invented certain new and useful Improvements in Insulating Compounds, of which the following is a specification.

The present invention relates to compositions of matter and more particularly to those compositions which are employed for insulating electrical conductors and apparatus.

The object of our invention is to provide a readily moldable composition which shall be both mechanically and dielectrically strong at all temperatures up to and above that of boiling water and of lower cost than the insulating substances heretofore in use.

Our invention consists, speaking generally, of a composition made by mixing of a relatively large proportion of comminuted inert material, a quantity of fibrous matter sufficient to give the finished product its desired tensile strength and toughness and an amount of prepared resinous substance which is made by the application of heat to unite intimately with the inert matter, and subjecting the heated mixture to pressure in a suitable mold from which it may be removed when cooled in its finished state.

The inert material may be clay, sand, ground stone, or any other refractory substance having good insulating properties. We have found ground slate to possess both mechanical and dielectric properties to a highly satisfactory degree in compositions for use upon trolley wire suspenders and similar appliances. The degree of comminution will vary according to the strength and general appearance desired in the finished article.

The fibrous matter which serves as a binder for the composition may be of asbestos or other dielectric fibrous material. We have used a mixture of the cheaper grades of asbestos, such as yellow, and short white either singly or together in equal amounts, and a small quantity of a better grade in the proportion of about 94 pounds of the former grade or grades to six of the latter grade with good results.

The resinous substance which we employ consists, for the larger part, of the cheaper grades of copal with the addition of a bituminous substance such as asphaltum or gilsonite whereby the melting temperature of the resinous substance may be raised as much as desired above the highest temperature to which the insulation will be subjected in practice. A resinous substance consisting of twenty-six parts kauri, forty-five parts copal dust or chips, twenty-two parts gilsonite and seven parts ordinary rosin produces an excellent gum and at a very low cost.

The several constituents may be mixed in various proportions according to the service to which the insulation composition will be subjected in practice, that is to say, in places where great mechanical strength is not required, the proportion of inert material may be greatly increased and where great tensile strength is required the resinous substance or the fibrous material will be increased. We have found, however, that for ordinary purposes the following proportions produce an insulating composition which is thoroughly satisfactory in practice and of very low cost; viz., about sixty-seven parts of comminuted inert material (preferably ground slate) ten parts of asbestos, and twenty-three parts of resinous substance prepared as above described. These ingredients are thoroughly commingled and heated in any suitable manner to 380 degrees Fahrenheit at which temperature the resinous substance is rendered viscous and readily combines with the other ingredients. The composition is placed while heated into hot iron molds and subjected to pressure which varies according to the use for which the particular article is intended. When the mold has become cooled the finished article may be removed in the ordinary manner.

We do not desire to restrict ourselves to the particular ingredients or the method of combination thereof above described, since it is apparent that they may be changed and modified without departing from our invention.

What we claim as new and desire to secure by Letters Patent of the United States, is,—

1. An electrical insulating compound moldable into desired shapes by the application of heat and pressure and consisting of comminuted inert material, and a binder comprising copal gum and a bituminous substance to raise the melting point of the latter.

2. An electrical insulating compound moldable into desired shapes by the application of heat and pressure and consisting of ground slate, asbestos and a binder comprising copal gum and gilsonite.

3. A moldable insulating compound consisting of ground inert material, and a binder comprising copal and kauri gums rendered less fusible by the admixture therewith of a small amount of gilsonite.

4. A moldable insulating compound consisting of the following constituents in about the proportions specified to wit: sixty-seven parts of inert material, ten parts of asbestos, six parts of kauri, ten parts of copal, five parts of gilsonite and two parts of rosin.

In witness whereof, we have hereunto set our hands this 24th day of December, 1903.

PATRICK J. CANNON.
WILLIAM H. YOUNG.
CLINTON BATEHOLTS

Witnesses:
BENJAMIN B. HULL,
MARGARET E. WOOLLEY.